United States Patent [19]
Eisele

[11] Patent Number: 6,066,935
[45] Date of Patent: May 23, 2000

[54] POLE-CHANGING ASYNCHRONOUS FAN MOTOR WITH CONTINUOUSLY ADJUSTABLE SPEED

[75] Inventor: Max Eisele, Erlangen, Germany

[73] Assignee: Siemens Aktiengesellschaft, München, Germany

[21] Appl. No.: 08/157,050

[22] PCT Filed: May 25, 1992

[86] PCT No.: PCT/EP92/01174

§ 371 Date: Dec. 2, 1993

§ 102(e) Date: Dec. 2, 1993

[87] PCT Pub. No.: WO92/21866

PCT Pub. Date: Dec. 10, 1992

[30] Foreign Application Priority Data

Jun. 3, 1991 [EP] European Pat. Off. .............. 91109043

[51] Int. Cl.$^7$ ...................................................... H02P 1/38
[52] U.S. Cl. ........................................... 318/773; 318/812
[58] Field of Search .................................... 318/772–777, 318/731–732, 798–812

[56] References Cited

U.S. PATENT DOCUMENTS

| | | |
|---|---|---|
| 3,308,363 | 3/1967 | Rawcliffe et al. ...................... 318/773 |
| 3,584,278 | 6/1971 | Krabbe . |
| 4,489,265 | 12/1984 | Kuznetsov .............................. 318/773 |
| 4,644,242 | 2/1987 | Takata et al. ....................... 318/773 X |
| 4,784,580 | 11/1988 | Takata et al. ....................... 318/773 X |
| 4,928,051 | 5/1990 | Demeter et al. .................... 318/773 X |

FOREIGN PATENT DOCUMENTS

| | | |
|---|---|---|
| 0 171 245 A3 | 2/1986 | European Pat. Off. . |
| 0 248 747 A1 | 12/1987 | European Pat. Off. . |
| 1 315 778 | 12/1962 | France . |
| 2607187 | 11/1986 | France . |

*Primary Examiner*—David Martin
*Attorney, Agent, or Firm*—Kenyon & Kenyon

[57] ABSTRACT

The invention relates to a fan installation with at least one pole-changing asynchronous motor (6, 7) for the driving of a fan (8, 9), a regulating device (14, 15) being provided by which the speed of rotation of the asynchronous motor (6, 7) is continuously regulatable within a predeterminable speed range by reducing the voltage. The speed of rotation of the fan (8, 9) can thus be matched to the required amount of air or quantity of heat to be dissipated by only a few switchovers or switchings-on.

11 Claims, 2 Drawing Sheets ing speed range, being step-wise adjustable, and a lower speed range, being continuously adjustable. The drive motor is then supplied with a voltage proportional to the frequency in the high-power stage (small number of poles), i.e., in the upper speed of rotation range. In the lower power stage (larger number of poles), the speed of rotation of the drive motor is continuously changed via the voltage. By reducing the voltage below the rated value, the slip of the asynchronous motor is increased. In this way, the speed of rotation of the fan drops below the rated speed of rotation of the higher number of poles and the amount of air led away is accordingly reduced. The speed of rotation of the fan can thus be continuously adapted to the amount of heat to be dissipated in a structurally simple manner over a wide range, for instance 0–75%. Only in the upper speed of rotation range is there a stepwise adaptation of the speed of rotation of the motor, and thus of the speed of rotation of the fan.

POLE-CHANGING ASYNCHRONOUS FAN MOTOR WITH CONTINUOUSLY ADJUSTABLE SPEED

BACKGROUND OF THE INVENTION

The present invention relates to a fan installation having at least one pole-changing asynchronous motor for driving the fan.

To maintain the temperature of the cooling water of an internal combustion engine (for instance a diesel engine) within a narrow range (about 5° C.), the amount of air through the radiator, and thus the speed of rotation of the cooling fan, must be adjustable. Three-phase asynchronous motors are used to drive the fan due to their robustness. The fans are powered either from an auxiliary operating power supply or from a three-phase generator which is driven by the internal combustion engine which is to be cooled.

Fan installations having at least one pole-changing asynchronous motor for driving the fan are known in diesel electric locomotives. In such fan installations, several pole-changing asynchronous motors may be provided. The amount of air can then be varied by the switching a different number of fans on and off and/or by switching the poles of the fan drive motor. With, for instance, three two-step asynchronous motors, a six-step regulation of the speed of rotation is thus obtained. Due to the characteristic of the diesel engine and the different environmental conditions, changes in speed of rotation and thus switch-overs are frequently necessary.

A fan unit in which stepwise regulation of the speed of rotation is effected by pole changing of a two-step fan drive motor is known from French Patent Application FR-A-2 607 187. Within one step, the speed of rotation of the fan is substantially proportional to the speed of rotation of the combustion engine and thus proportional to the frequency of the generator feeding the fan drive motor, the generator being driven by the combustion engine. Within one step, continuous regulation of the fan drive motor is not possible.

U.S. Pat. No. 3,584,728 describes a control device for cranes, the characteristic of which, however, is very different from that of a fan drive. Thus, for example, in the case of crane drives, the power is substantially proportional to the speed of rotation of the drive motor, which in the case of fan installations, the output is proportional to the third power of the speed of rotation of the drive motor.

Furthermore, fan installations in which the non-pole-changing asynchronous motor is fed via a converter are known. In this way, the speed of rotation can be continuously regulated and the temperature of the cooling water thus kept within narrow limits, and the frequent switchings-over or switchings-on avoided. Unfortunately, these fan installations are very expensive.

In view of the numerous drawbacks of the known fan installations, there is a need to provide a fan installation in which the speed of rotation of the fan, and thus the amount of air, can be matched in simple manner to the amount of heat to be dissipated, in particular with the fewest possible switchovers or switchings-on.

SUMMARY OF THE INVENTION

This need is achieved in accordance with the present invention by providing the fan installation with a regulating device by which the speed of rotation of the asynchronous motor can be continuously adjusted within a predeterminable speed range.

In the fan installation of the present invention, a pole-changing asynchronous motor is provided as drive motor for the fan. The speed of rotation of the drive motor is continuously adjustable within a predetermined range of speeds of rotation by controlling the voltage.

The ranges of speeds of rotation which can be freely selected within the overall range of speeds of rotation of the drive motor are preferably divided into an upper speed range, being step-wise adjustable, and a lower speed range, being continuously adjustable. The drive motor is then supplied with a voltage proportional to the frequency in the high-power stage (small number of poles), i.e., in the upper speed of rotation range. In the lower power stage (larger number of poles), the speed of rotation of the drive motor is continuously changed via the voltage. By reducing the voltage below the rated value, the slip of the asynchronous motor is increased. In this way, the speed of rotation of the fan drops below the rated speed of rotation of the higher number of poles and the amount of air led away is accordingly reduced. The speed of rotation of the fan can thus be continuously adapted to the amount of heat to be dissipated in a structurally simple manner over a wide range, for instance 0–75%. Only in the upper speed of rotation range is there a stepwise adaptation of the speed of rotation of the motor, and thus of the speed of rotation of the fan.

Various regulating devices are conceivable to regulate the speed of rotation of the drive motor. Thus, the regulating device can be, for example, a converter. However, such an embodiment would be relatively expensive. Providing the fan installation with one of the following regulating devices is substantially less expensive:

a) at least one voltage regulator such as ca controllable semiconductor element for example, and in particular, thyristoirs operating with phase control or transistors connected between an auxiliary operating supply and one of the asynchronous motors by which the voltage in the lower speed range can be reduced;

b) at least one voltage regulator such as a controllable semiconductor element for example, and in particular, thyristors operating with phase control or transistors connected between an auxiliary operating supply and one of the asynchronous motors by which the voltage in the upper and lower speed ranges can be reduced; or c) a regulating device formed by a separate generator, the voltage being adjustable via the exciter current of the generator which can be lowered such that the desired fan speed rotation is established.

If the pole-changing reversing asynchronous motors of the fan installation are fed from an auxiliary operating supply, then an embodiment in which the regulating device comprises at least one voltage regulator connected between the auxiliary operating supply and one of the asynchronous motors is particularly advantageous. In the high speed step, the asynchronous motor is fed directly from the auxiliary operating supply. In the lower speed step, the speed of rotation of the drive motor is adjusted by reducing the voltage of the individual phases by means of a voltage regulator. The voltage regulator can include, for instance, controllable semiconductor elements. These semiconductor elements are preferably thyristors operating with phase control or transistors. In the above described fan installation, even in the case of several fans, the corresponding drive motors advantageously do not require any further voltage regulators. The further drive motors are operated in the fast or slow speed step or are disconnected. The auxiliary operating supply can be provided, by a generator or some other auxiliary operating supply, either with constant voltage and frequency or, in the case of variable frequency, with a frequency-proportional voltage.

A fan installation having a voltage regulator arranged between the auxiliary operating supply and one of the asynchronous motors is suitable, in particular, for auxiliary operating power supplies of variable frequency in the case of which the voltage cannot be adjusted or can be adjusted only to a very limited extent. With the voltage regulator, a decrease in voltage is obtained also in the upper speed range. Thus, the desired frequency-proportional voltage is obtained in this range.

A fan installation in which the regulating device is formed as a separate generator is particularly inexpensive for uses in which the drive motor of the fan is fed by an auxiliary generator which is driven by a diesel engine with variable speed of rotation. The exciter current of the synchronous generator is adjusted so that, in the fast speed step of the fan, the voltage is decreased proportionally to the frequency of the generator and, in the slower speed step, the voltage is decreased via the exciter current to such an extent that the desired speed of rotation of the fan is adjusted.

The fan installation of the present invention is not limited solely to the use described in connection with radiators of diesel electric locomotive. Rather, the fan installation is suitable also for other fields of use in which the amount of heat to be dissipated and/or the temperature of the cooling air can vary widely as, for instance, in the case of stationary diesel-generator installations.

With a fan installation providing a current displacement rotor for driving the fan a favorable structural size results due to the lower rotor losses. In this fan installation, the ratio of the low number of poles to the higher number of poles is selected preferably between 0.4 and 0.8.

If the maximum frequency with which the asynchronous motor can be operated does not agree with the customary industrial frequency of 50 or 60 Hz, then servicing is facilitated if the voltage of the motor is so selected that it corresponds at industrial frequency to the corresponding power-line voltage.

DETAILED DESCRIPTION

Figure 1:
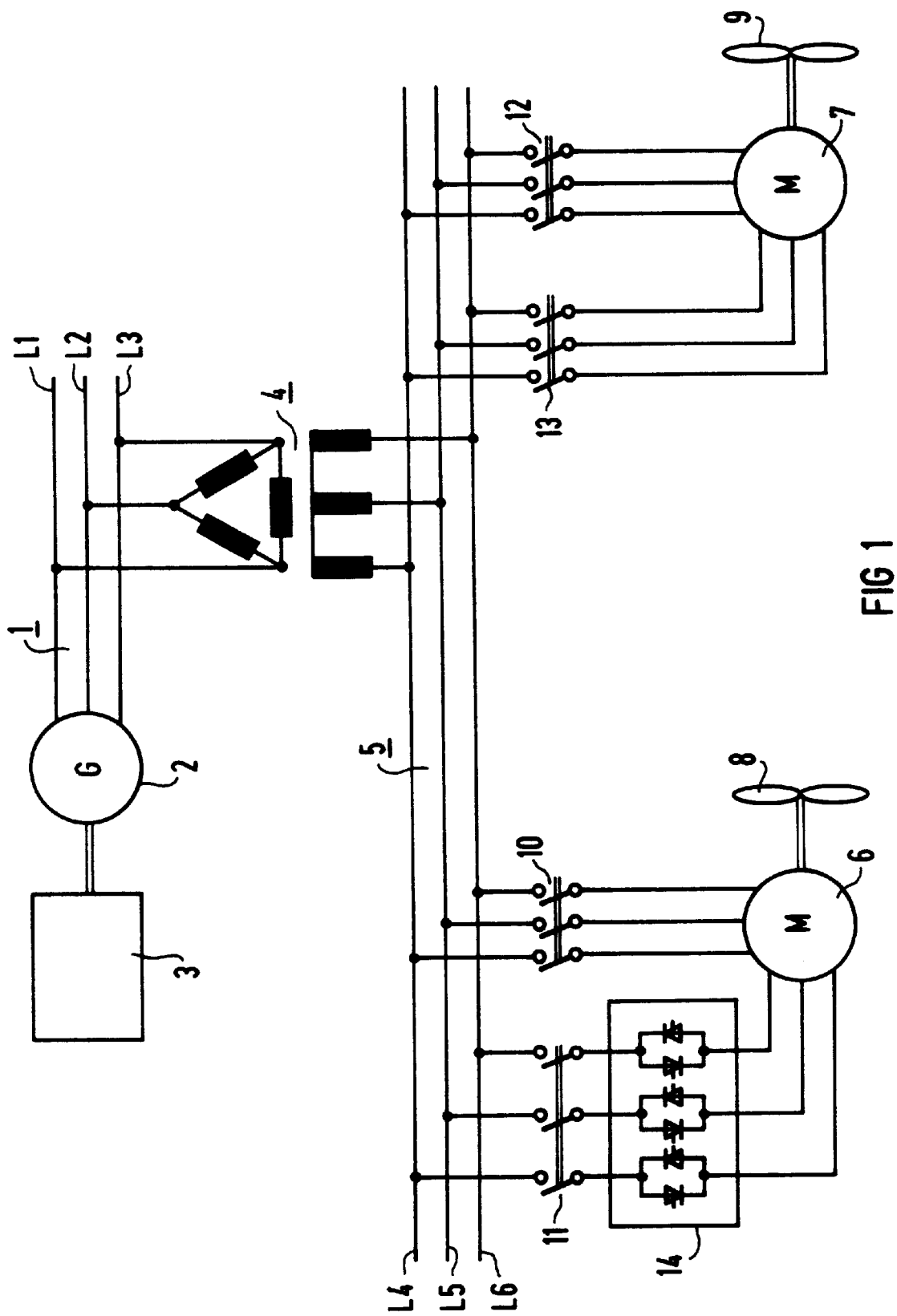
FIG. 1 is a basic circuit diagram of a first embodiment of the fan installation of the present invention, in which the drive motor is fed directly from an auxiliary operating supply.

In FIG. 1, a three-phase vehicle electrical system 1 of a diesel electric drive is fed by a generator 2 which is driven by a diesel engine 3 which is to be cooled.

The primary windings 41, 42, 43 of a transformer 4 are connected to the wires L1, L2, L3 of the vehicle electrical system 1. The secondary windings 44, 45, 46 of the transformer 4 are connected to the wires L4, L5, L6 of an auxiliary operating supply 5. The auxiliary operating supply 5 can be also supplied with constant voltage and frequency or with the frequency-proportional voltage via the transformer 4 from the generator 2.

In the embodiment shown, the primary windings 41, 42, 43 are connected in delta and the secondary windings 44, 45, 46 in star or "Y". Both voltage matching and potential separation between the vehicle electrical system 1 and the auxiliary operating supply 5 are effected by the transformer 4. Further loads (not shown in FIG. 1) such as, for instance, traction converters with traction motors arranged behind them are also connected to the vehicle electrical system 1.

Drive motors 6, 7 for fans 8, 9 are connected to the wires L4, L5, L6 of the auxiliary operating supply 5. The drive motors 6, 7 in the embodiment shown are pole-changing two-step asynchronous motors the poles of which are connected in each case via two switches 10, 11 and 12, 13, respectively, to the wires L4, L5, L6 of the auxiliary operating supply 5.

In the upper speed range (fast speed step, low number of poles), the switch 10 is closed and the asynchronous motor 6 is fed directly from the auxiliary operating supply 5. In the range lying below the upper speed range (slower speed stage, higher number of poles), hereinafter referred to as the lower speed range, switch 11 is closed and switch 10 open.

A voltage regulator 14 is arranged between the switch 11 and the asynchronous motor 6. The voltage regulator 14 comprises a number of thyristor groups corresponding to the number of wires L4, L5, L6 of the auxiliary operating supply 5. Each thyristor group consists of two thyristors in antiparallel connection. Each wire L4, L5, L6 of the auxiliary operating supply 5 is connected via a thyristor group with the corresponding connection of the same phase for the slower speed step of the asynchronous motor. By means of the voltage regulator 14, with switch 11 closed and switch 10 open, the rated voltage of the auxiliary operating supply 5 is lowered and in this way the speed of rotation of the asynchronous motor 6 is adjusted within the lower speed range.

With the fan installation of the invention, the speed of rotation in the lower speed range can thus be regulated continuously as with a converter, but at more favorable cost. In the upper range, in which the high power is the important factor, a stepwise adjustment of the speed takes place.

If several fans are used, then the further drive motors (for example, the asynchronous motor 7 of the fan 9 in FIG. 1) no longer require a voltage regulator. They are operated in the fast or slow speed step (switch 12 or 13 closed) or are disconnected.

Figure 2:
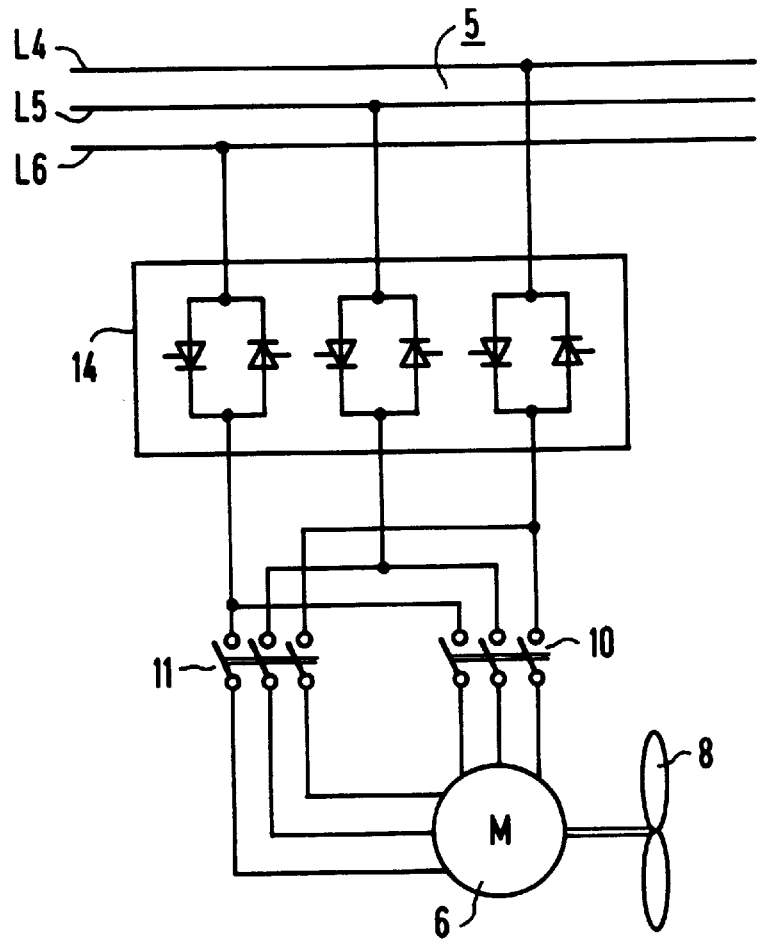
FIG. 2 is a basic circuit diagram of a second embodiment of the fan installation of the present invention, in which the drive motor is fed with variable frequency from an auxiliary operating supply.

In the case of auxiliary operating supplies of variable frequency in which the voltage cannot be adjusted or can be adjusted only to a very limited extent, the voltage regulator 14 is to be connected as shown in FIG. 2 to the asynchronous motor 6 of the fan 8.

The voltage regulator 14 has the construction illustrated in FIG. 1. Each wire L4, L5 and L6 of the auxiliary operating supply 5 is connected via a thyristor group with the corresponding connections of the same phase for the slower and fast speed steps of the asynchronous motor 6. A reduction of the voltage is thus also obtained in the upper speed range by the voltage regulator 14. In this way, the desired frequency-proportional voltage is obtained in this range.

Figure 3:
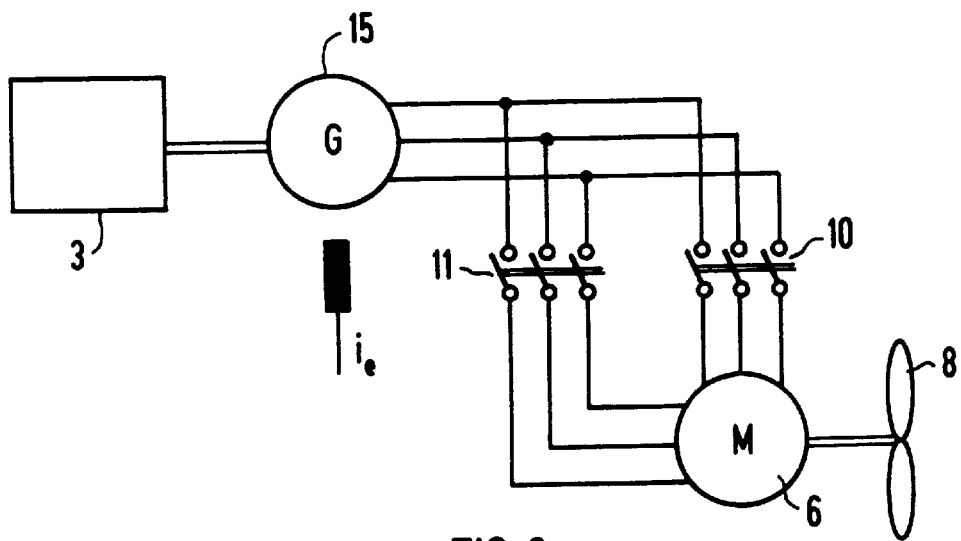
FIG. 3 is a basic circuit diagram of another embodiment of the fan installation of the present invention in which the drive motor is fed by its own generator.

In the embodiment shown in FIG. 3, the asynchronous motor 6 of the fan is fed directly by a separate generator (auxiliary generator 15), which is also driven by the diesel engine 3 which is to be cooled. The regulating device of the present invention is formed by the auxiliary generator 15, the exciter current $i_e$ of which is regulated such that, in the upper speed range of the asynchronous motor 6 (switch 10 closed, switch 11 open) the voltage is reduced proportionally to the frequency of the auxiliary generator 15 and in the lower speed range (switch 10 open and switch 11 closed) the voltage is reduced to such an extent via the exciter current $i_e$ that the desired speed of rotation of the asynchronous motor and thus of the fan 8 is obtained.

I claim:

1. A device comprising:
   a) a pole-changing asynchronous motor for driving a fan; and
   b) a regulating device coupled with said motor and adapted to continuously adjust a speed of rotation of said motor, within a predetermined speed range once a voltage supplied to said motor is decreased below a certain level;
   wherein said motor has a first speed range within said predetermined speed range, and
   wherein said regulating device is adapted to continuously adjust said speed of rotation of said motor within said first speed range and to stepwise adjust said speed of rotation of said motor within a remainder of said predetermined speed range.

2. A device comprising:
   c) a pole-changing asynchronous motor for driving a fan; and
   d) a regulating device coupled with said motor and adapted to continuously adjust a speed of rotation of said motor, within a predetermined speed range once a voltage supplied to said motor is decreased below a certain level;
   wherein said motor has an upper speed range and a lower speed range within said predetermined speed range, and
   wherein said regulating device is adapted to stepwise adjust said speed of rotation of said motor within said upper speed range and to continuously adjust said speed of rotation of said motor within said lower speed range.

3. The device of claim 2 further comprising
   c) an auxiliary operating supply coupled with said pole-changing asynchronous motor and adapted to supply said pole-changing asynchronous motor with voltage,
   wherein said regulating device comprises a voltage regulator coupled between said auxiliary operating supply and said asynchronous motor, said voltage regulator adapted to reduce the voltage in said lower speed range.

4. The device of claim 2 further comprising
   c) an auxiliary operating supply coupled with said pole-changing asynchronous motor and adapted to supply said asynchronous motor with voltage,
   wherein said regulating device comprises a voltage regulator coupled between said auxiliary operating supply and said asynchronous motor, said voltage regulator adapted to reduce the voltage in said upper and lower speed ranges.

5. The device of claim 3 wherein said voltage regulator consists of controllable semiconductor elements.

6. The device of claim 4 wherein said voltage regulator consists of controllable semiconductor elements.

7. The device of claim 5, wherein said controllable semiconductor elements are thyristors which operate with phase control.

8. The device of claim 6, wherein said controllable semiconductor elements are thyristors which operate with phase control.

9. The device of claim 5, wherein said controllable semiconductor elements are transistors.

10. The device of claim 6, wherein said controllable semiconductor elements are transistors.

11. A device of comprising;
    a) pole-changing asynchronous motor for driving a fan, wherein said motor has an upper speed range and a lower speed range within said predetermined speed range; and
    b) a separate generator coupled with said pole-changing asynchronous motor, supplied with an exciter current, and adapted to supply said pole-changing asynchronous motor with voltage, wherein said generator is adapted to stepwise adjust said speed of rotation of said motor within said upper speed range and to continuously adjust said speed of rotation of said motor within said lower speed range, the voltage being adjustable via said exciter current of said generator and capable of being lowered to such an extent in the slower speed step that the desired fan speed of rotation is established.

* * * * *